United States Patent
Brablec et al.

(10) Patent No.: US 6,292,545 B1
(45) Date of Patent: Sep. 18, 2001

(54) APPARATUS AND METHOD FOR DETECTING THE SOURCE OF A TELEPHONE TONE SIGNAL

(75) Inventors: Milos Brablec, Skokie; Chavdar Ivanov, River Grove, both of IL (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/086,202

(22) Filed: May 28, 1998

(51) Int. Cl.[7] .................................................. H04M 1/64
(52) U.S. Cl. ......................... 379/88.24; 379/74; 379/386
(58) Field of Search .................................. 379/377, 386, 379/77, 67.1, 85, 88.22, 88.24, 387.01

(56) References Cited

U.S. PATENT DOCUMENTS

| | | |
|---|---|---|
| 3,715,518 | 2/1973 | Campbell et al. ............... 379/102.02 |
| 3,725,589 | 4/1973 | Golden .................................... 379/75 |
| 3,899,645 | 8/1975 | Brafman ............................... 379/355 |
| 3,978,289 | 8/1976 | Konno ..................................... 379/77 |
| 4,314,103 | 2/1982 | Wilson ..................................... 379/77 |
| 4,696,031 | * 9/1987 | Freudberg et al. .................. 379/386 |
| 4,941,168 | * 7/1990 | Kelly, Jr. ................................ 379/69 |
| 5,070,526 | * 12/1991 | Richmond et al. .................. 379/372 |
| 5,313,516 | * 5/1994 | Afshar et al. ......................... 379/67 |
| 5,638,424 | * 6/1997 | Denio et al. ........................... 379/67 |
| 5,644,624 | * 7/1997 | Caldwell ................................ 379/69 |

* cited by examiner

Primary Examiner—Scott L. Weaver
(74) Attorney, Agent, or Firm—Baniak Pine & Gannon

(57) ABSTRACT

A telephone answering apparatus for detecting the source of a telephone tone signal includes a signal detector for detecting the telephone tone signal, a memory storage device for storing a message, and a controller for stopping playback of the message in response to the telephone tone signal wherein the controller determines whether the telephone tone signal is present while playback of the message is stopped. A timer is operatively connected to the signal detector to designate a period of time for the signal detector to detect for the presence of the telephone tone signal while playback of the message is stopped.

14 Claims, 2 Drawing Sheets

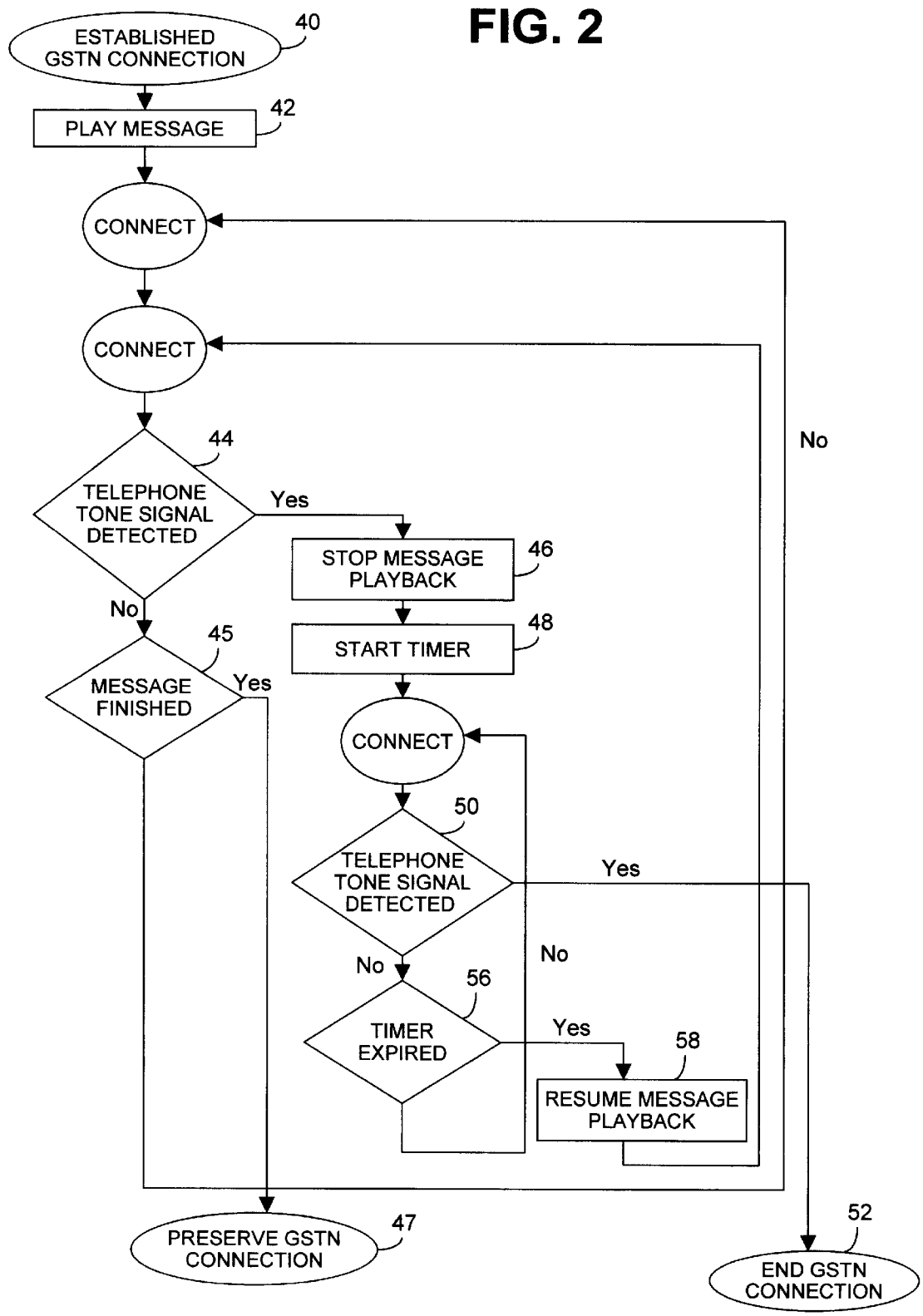

APPARATUS AND METHOD FOR DETECTING THE SOURCE OF A TELEPHONE TONE SIGNAL

FIELD OF THE INVENTION

This invention relates generally to the field of automatic telephone answering systems and, in particular, to an apparatus for detecting the source of a telephone tone signal during the playback of a recorded message.

BACKGROUND OF THE INVENTION

There are various types of systems which automatically answer an incoming call and maintain a telephone line connection which are broadly defined as automatic telephone answering systems. These systems include, for example, automatic telephone message recording equipment, message recording systems having remote access message playback, automatic telephone call forwarding equipment, automatic dial-up alarm receiving equipment, automatic answering data entry systems, and other telephone devices used in association with modem equipment. Each of these systems typically include some means for establishing a connection to the telephone line and for disconnecting from the telephone line.

Disconnection from a telephone line is typically accomplished by providing a telephone tone detector which causes the disconnection of the telephone line in response to, for example, the detection of a dial tone generated after the calling party hangs up. Difficulties arise, however, in a message recording system having remote access playback capabilities. For example, a dial tone may be present during the recording interval of a message and, as a result, the dial tone may be recorded. When a remote access connection is established and the message is played back, the dial tone detector may detect the recorded dial tone and cause the inadvertent disconnection of the telephone line.

Accordingly, it would be desirable to have a simple and cost effective apparatus for detecting the source of a telephone tone signal that overcomes the disadvantages described above.

SUMMARY OF THE INVENTION

One aspect of the invention provides a telephone answering apparatus for detecting a telephone tone signal including a signal detector for detecting the telephone tone signal. A timer is operatively connected to the signal detector to designate a period of time to allow the signal detector to detect for the presence of the telephone tone signal while playback of a message is stopped. The telephone tone signal may include a dial tone or a busy tone.

Another aspect of the invention provides an apparatus for detecting a tone signal including a signal detector for detecting the tone signal, a memory device for storing a message, and a controller for stopping playback of the message in response to the tone signal. The controller determines whether the tone signal is present while playback is stopped. A timer may preferably be operatively connected to the signal detector to designate a period of time for the signal detector to detect for the presence of the tone signal while playback is stopped.

Another aspect of the invention provides a method for detecting the source of a tone signal in a telephone answering system. A signal detector, a memory device, and a controller are provided. A message is played. When a tone signal is detected, the playing of the message is stopped and the controller determines whether the detected tone signal is present while the message is stopped. A timer may preferably be provided. A timer sequence may be initiated in response to the message being stopped. The controller may preferably determine whether the detected tone signal is present during the timer sequence. The timer sequence may preferably end. The playing of the message may resume in response to ending the timer sequence. The telephone line connection may be disconnected when a tone signal is detected during the timer sequence. A telephone line connection to the telephone answering system may be initiated. The tone signal may be a dial tone or a busy tone.

Another aspect of the invention provides a telephone answering apparatus for detecting a tone signal including an audio player, a detector operatively connected to the audio player, and a controller operatively connected to the audio player. A timer is also operatively connected to the controller wherein the timer designates a period of time to allow the detector to detect for the presence of the tone signal while playback of a message by the audio player is stopped and wherein the controller determines whether the tone signal is present while playback of the message is stopped.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 2 is a flow chart which illustrates one embodiment of the operation of a telephone answering apparatus in accordance with the invention.

DETAILED DESCRIPTION OF THE PRESENTLY PREFERRED EMBODIMENTS

Figure 1:
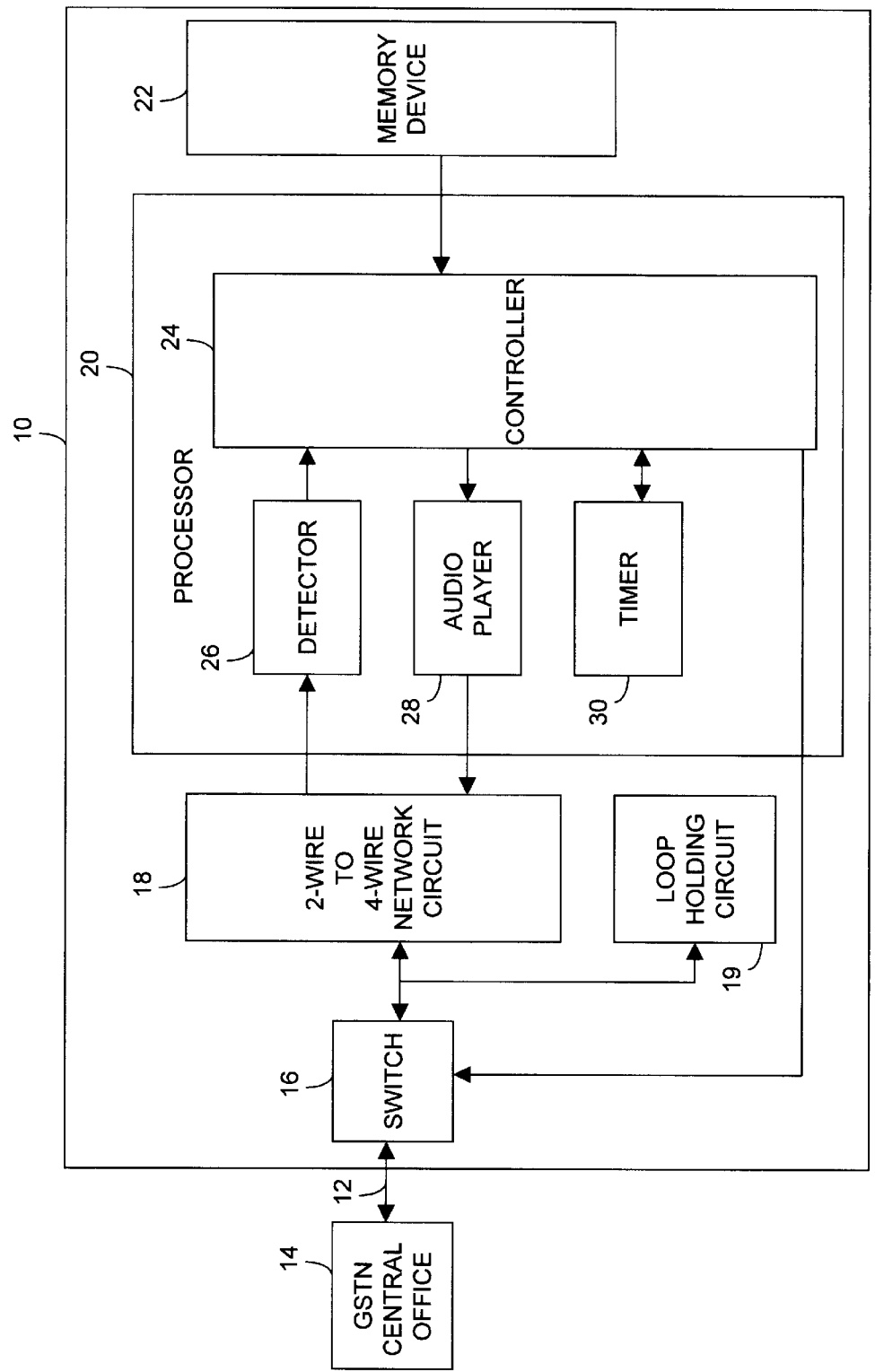
FIG. 1 is a block diagram of a preferred embodiment of a telephone answering apparatus in accordance with the invention.

As shown in FIG. 1, a telephone answering apparatus 10 is operatively connected by a telephone line 12 to a General Switched Telephone Network (GSTN) central office 14. The GSTN central office 14 transmits telephone tone signals including, for example, busy tones or dial tones, along the telephone line 12. The telephone answering apparatus 10 allows a recorded telephone tone signal to be distinguished from a real telephone tone signal to prevent the inadvertent disconnection of the telephone line 12 during playback of a message that contains a recorded telephone tone signal.

The telephone answering apparatus 10 includes a switch 16, a 2-wire to 4-wire network circuit 18, a loop holding circuit 19, a processor 20, and memory device 22. The memory device 22 may be any of the commercially available memory devices such as, for example, an EEPROM (Electrically Erasable Programmable Read Only Memory), a SRAM (Static Random Access Memory) or Flash Memory suitable for storing audio data received by the telephone answering apparatus 10.

The processor 20 may be any of the commercially available processors. The processor 20 may preferably be a digital signal processor such as, for example, a TMS 320C52 manufactured by Texas Instruments Inc. In the embodiment shown, the processor 20 preferably executes software or firmware which functionally provides a controller 24, a detector 26, an audio player 28, and a timer 30. One embodiment of the apparatus 10 is the Sportster Message Plus supplied by 3Com Corporation. Alternatively, the controller 24, detector 26, audio player 28, and timer 30 may be comprised of discrete circuits which may be operatively connected to the processor 20. The controller 24 controls the various functions carried out by the telephone answering apparatus 10. The detector 26 detects telephone tone signals such as, for example, busy tones or dial tones. The audio player 28 converts audio data into an audio signal and plays the audio signal.

The switch 16 may be any of the commercially available switches including, for example, a relay switch or an electronic switch. As shown in FIG. 1, the switch 16 is operatively connected to the 2-wire to 4-wire network circuit 18 and the loop holding circuit 19. Upon activation of the switch 16, the loop holding circuit 19 drains current from the GSTN central office 14. Upon detection of the current drain by the GSTN central office 14, the GSTN central office 14 assigns a telephone line thereby establishing a telephone connection to the telephone answering apparatus 10.

The 2-wire to 4-wire network circuit 18 functions to combine signals which are both transmitted and received by the processor 20 along the telephone line 12. In particular, the 2-wire to 4-wire network circuit 18 routs signals from the telephone line 12 to the detector 26, and at the same time routs signals from the audio player 28 to the telephone line 12.

In operation, the telephone answering apparatus 10 is connected to the telephone line 12 by switch 16, which is controlled by the controller 24. When a user initiates playback of a message, the controller 24 retrieves audio data from the memory device 22 and transfers the audio data to the audio player 28. The audio player 28 converts the audio data into an audio signal which is then fed into the telephone line 12 via the 2-wire to 4-wire network circuit 18. The 2-wire to 4-wire network circuit 18 is operatively connected to the detector 26. As a result, during message playback, the detector 26 detects for the presence of telephone tone signals.

If the detector 26 detects a telephone tone signal from the telephone line 12 or from the audio player 28 during message playback, the controller 24 stops message playback and starts timer 30 which provides a period of time for the detector 26 to detect the presence of a telephone tone signal while playback of the message is stopped. The timer 30 may preferably be a 15 bit timer, and may preferably have a resolution of one second. Therefore, the maximum measurable duration of the timer sequence may be 32,767 seconds.

If the detector 26 detects a telephone tone signal when message playback is stopped, the controller 24 causes the switch 16 to disconnect the telephone connection between telephone line 12 and the telephone answering apparatus 10. If no telephone tone signal is detected by the detector 26 within this period of time, the controller 24 resumes playback of the message from the point where it was previously stopped.

FIG. 2 illustrates one example of the operation of the telephone answering apparatus 10 in accordance with the invention. Reference is made to both FIGS. 1 and 2 in the following discussion. During a recording operation, the telephone answering apparatus 10 records a message which is stored in the memory device 22 as audio data. The message recorded may or may not include a telephone tone signal such as a dial tone or a busy tone.

Block 40 represents an "off-hook, on-line" state wherein a telephone connection has been established between the GSTN central office 14 and the telephone answering apparatus 10. Block 42 represents the playing of a message in response to an instruction initiated by the user. As shown in Block 44, if the detector 26 does not detect a telephone tone signal such as a dial tone or busy tone, the controller 24 will not stop the playback of the message. As shown in Blocks 44 and 45, the detector 26 will continuously detect for the presence of a telephone tone signal until message playback is completed. As shown in Blocks 44, 45, and 47, if the detector 26 does not detect a telephone tone signal during playback of the message, the GSTN connection will be preserved. As shown in Blocks 44 and 46, if a telephone tone signal is detected by the detector 26, the playback of the message is stopped by the controller 24.

As represented in Block 48, after playback of the message is stopped, a timer sequence is initiated by the timer 30. The timer sequence provides a period of time for the detector 26 to detect for the presence of a real telephone tone signal since the playback of the recorded message is stopped. As shown in Blocks 50, 52, and 56, if the signal detector 26 detects a real telephone tone signal during the timer sequence, the telephone line 12 connection will be disconnected by switch 16, ending the telephone connection.

As shown in Blocks 50 and 56, if the detector 26 does not detect a telephone tone signal during the timer sequence, the detector 26 will continue to monitor for the presence of a real telephone tone signal continuously for an amount of time necessary to reliably detect telephone tone signals. The amount of time may be, for example, ten seconds for a busy tone and five second for a dial tone, although other time periods may be sufficient. As shown in Blocks 56 and 58, if the timer sequence expires, the controller 24 will resume message playback from the point it was previously stopped.

An advantage of the telephone answering apparatus 10 is that it has the ability to distinguish a recorded telephone tone signal from a real telephone tone signal. This prevents the termination of the telephone connection by the telephone answering apparatus 10 when a message which contains a telephone tone signal is played back.

The telephone answering apparatus 10 may used for in a wide variety of automatic telephone answering systems including, for example, automatic telephone message recording equipment, automatic telephone call forwarding equipment, automatic dial-up alarm receiving equipment, and automatic answering data entry systems. It is contemplated that the telephone answering apparatus 10 may be used in wide variety of other types of telephone answering systems.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A telephone answering apparatus for detecting a telephone tone signal comprising:

a signal detector for detecting the telephone tone signal, a controller for stopping playback of a message in response to the telephone tone signal wherein the controller determines whether the telephone tone signal is present while playback of the message is stopped, and a timer operatively connected to the signal detector to designate a period of time to allow the signal detector to detect for the presence of the telephone tone signal while playback of the message is stopped.

2. The apparatus of claim 1 wherein the telephone tone signal comprises a dial tone.

3. The apparatus of claim 1 wherein the telephone tone signal comprises a busy tone.

4. An apparatus for detecting a tone signal comprising:

a signal detector for detecting the tone signal, a memory device for storing a message, and a controller for stopping playback of the message in response to the tone signal wherein the controller determines whether the tone signal is present while playback of the message is stopped.

5. The apparatus of claim 4 further comprising a timer operatively connected to the signal detector to provide a period of time for the signal detector to detect for the presence of the tone signal while playback is stopped.

6. A method for detecting the source of a tone signal in a telephone answering system comprising:

(a) providing a signal detector, a memory device, and a controller;

(b) playing a message;

(c) detecting a tone signal;

(d) stopping step (b) in response to step (c); and (e) determining whether the detected tone signal is present while the message is stopped.

7. The method of claim 6 further comprising:

(f) providing a timer, and (g) initiating a timer sequence in response to step (d).

8. The method of claim 7 wherein step (e) is repeated during the timer sequence.

9. The method of claim 7 further comprising:

(h) ending the timer sequence; and (i) resuming the playing of the message in response to ending the timer sequence.

10. The method of claim 7 further comprising:

(j) disconnecting a telephone line connection when a tone signal is detected during the timer sequence.

11. The method of claim 6 further comprising:

(k) initiating a telephone connection to the telephone answering system.

12. The method of claim 6 wherein the tone signal is a dial tone.

13. The apparatus of claim 6 wherein the tone signal is a busy tone.

14. A telephone answering apparatus for detecting a tone signal comprising:

an audio player, a detector for detecting the tone signal operatively connected to the audio player, a controller for stopping playback of the message in response to the tone signal operatively coupled to the audio player, and a timer operatively coupled to the controller wherein the timer designates a period of time to allow the detector to detect for the presence of the tone signal while playback of the message by the audio player is stopped and wherein the controller determines whether the tone signal is present while playback of the message is stopped.

* * * * *